United States Patent
Milliere et al.

(10) Patent No.: US 12,420,944 B2
(45) Date of Patent: Sep. 23, 2025

(54) MODULE FOR A DIHYDROGEN SUPPLY SYSTEM FOR AN AIRCRAFT ENGINE

(71) Applicants: Airbus SAS, Blagnac (FR); Airbus Operations SAS, Toulouse (FR)

(72) Inventors: Jérôme Milliere, Toulouse (FR); Lionel Czapla, Toulouse (FR); Alexis Pissavin, Blagnac (FR)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 19 days.

(21) Appl. No.: 18/608,140

(22) Filed: Mar. 18, 2024

(65) Prior Publication Data
US 2024/0317419 A1 Sep. 26, 2024

(30) Foreign Application Priority Data
Mar. 23, 2023 (FR) ........................... 2302721

(51) Int. Cl.
  *B64D 37/30* (2006.01)
  *B64D 37/32* (2006.01)
  *F02C 7/22* (2006.01)
  *F17C 13/12* (2006.01)

(52) U.S. Cl.
  CPC ............. *B64D 37/30* (2013.01); *B64D 37/32* (2013.01); *F02C 7/22* (2013.01); *F17C 13/12* (2013.01); *F17C 2260/037* (2013.01); *F17C 2260/042* (2013.01)

(58) Field of Classification Search
CPC . B64D 37/30; B64D 37/32; F02C 3/22; F02C 7/22; F02C 7/222; F17C 13/12; F17C 2260/037; F17C 2260/038; F17C 2260/042; F17C 2265/066; F17C 2270/0189

See application file for complete search history.

(56) References Cited

U.S. PATENT DOCUMENTS

| 2014/0023945 | A1 | 1/2014 | Epstein et al. |
| 2022/0146047 | A1 | 5/2022 | Bensadoun et al. |
| 2022/0340295 | A1 | 10/2022 | Jones et al. |
| 2024/0110524 | A1* | 4/2024 | Minas ............... F02C 7/232 |

FOREIGN PATENT DOCUMENTS

GB  2587558 A  3/2021

OTHER PUBLICATIONS

French Search Report for corresponding French Patent Application No. 2302721 dated Sep. 20, 2023.

* cited by examiner

*Primary Examiner* — Scott J Walthour
(74) *Attorney, Agent, or Firm* — Greer, Burns & Crain, Ltd.

(57) ABSTRACT

A module between a dihydrogen tank and an engine in an aircraft. The module comprises outer and inner boxes, a pipeline between the tank and the engine through the boxes, pressure limiters mounted on the pipeline and the inner box, an exhaust pipeline between the pressure limiters and the outside, shut-off valves mounted on the pipeline at the outer box, a detector for detecting a leak of the pipeline or of the outer box and a controller configured to control each shut-off valve as a function of the information delivered by the detector.

10 Claims, 3 Drawing Sheets

MODULE FOR A DIHYDROGEN SUPPLY SYSTEM FOR AN AIRCRAFT ENGINE

CROSS-REFERENCES TO RELATED APPLICATIONS

This application claims the benefit of French Patent Application Number 2302721 filed on Mar. 23, 2023, the entire disclosure of which is incorporated herein by way of reference.

FIELD OF THE INVENTION

The present invention relates to a module for a dihydrogen supply system for an aircraft engine, a supply system comprising at least two such modules, an aircraft comprising such a module, and an aircraft comprising such a supply system.

BACKGROUND OF THE INVENTION

In order to reduce the emissions of carbon dioxide ($CO_2$) from the aircraft engines, it is known practice to use dihydrogen as fuel. The aircraft then comprises a dihydrogen tank, and at least one engine supplied by said dihydrogen through pipelines which run in the aircraft, between the tank and each engine and on which pumps, re-heaters and valves are installed.

Safety must be assured if an incident occurs on the supply line between the tank and the engine. For that, it is known practice to put in place various safety systems.

Although such an arrangement is efficient when an incident occurs on the supply line, it is necessary to provide an arrangement which ensures the safety when a second incident occurs on the same supply line.

SUMMARY OF THE INVENTION

One object of the present invention is to propose a module for a dihydrogen supply system for an engine of an aircraft, in which said module makes it possible to ensure reinforced safety in the event of an incident.

To this end, a module is proposed for a dihydrogen supply system for an aircraft comprising a dihydrogen tank and an engine, said module comprising:
  an outer box having an air inlet and an air outlet,
  a leak-tight inner box, inert and housed in the outer box,
  a pipeline intended to be fluidically connected between the tank and the engine, and passing through the outer box and the inner box,
  a device housed in the inner box and arranged to act on the dihydrogen circulating in the pipeline,
  a first pressure limiter mounted on the pipeline in the inner box,
  a second pressure limiter mounted on the inner box,
  an exhaust pipeline fluidically connected between the first pressure limiter, the second pressure limiter and the outside of the aircraft, in the mounted position of the module in the aircraft,
  an upstream shut-off valve mounted on the pipeline at the inlet of the pipeline in the outer box,
  a downstream shut-off valve mounted on the pipeline at the outlet of the pipeline in the outer box,
  detection means provided to detect a leak between the pipeline and the inner box or a leak between the inner box and the outer box and to deliver information representative of such a leak, and
  a control unit arranged to control the opening and closing of each shut-off valve as a function of the information delivered by the detection means.

With such an arrangement, if two successive incidents occur on the module, the safety is guaranteed by evacuation of the dihydrogen to the outside. Furthermore, the dihydrogen originating from a leak is diluted with the ambient air, which limits the risks of ignition.

Advantageously, the exhaust pipeline emerges at the outside of the aircraft, in the mounted position of the module in the aircraft, via a check valve.

Advantageously, the part of the pipeline between the inner box and each shut-off valve takes the form of a double-skin pipeline.

Advantageously, the module comprises a third pressure limiter and a fourth pressure limiter, in which the third pressure limiter is mounted between the exhaust pipeline and the pipeline upstream of the inner box and in which the fourth pressure limiter is mounted between the exhaust pipeline and the pipeline downstream of the inner box.

Advantageously, the outer box is intended to be oriented so as to have the air inlet toward the front of the aircraft and the air outlet toward the rear of the aircraft, in the mounted position of the module in the aircraft.

Advantageously, the module comprises a discharge valve mounted on the pipeline which is in the inner box and fluidically connected to the exhaust pipeline, in which, on command from the control unit, the discharge valve can alternately take a first position in which the discharge valve lets the dihydrogen flow in the pipeline by preventing the flow of the dihydrogen to the exhaust pipeline, and a second position, in which the discharge valve lets the dihydrogen flow in the pipeline and the exhaust pipeline.

The invention also proposes a dihydrogen supply system for an aircraft comprising a dihydrogen tank and an engine, said supply system comprising at least two modules according to one of the preceding variants, in which the pipeline is common to all the modules, in which the outer box is common to all the modules, and in which the inner boxes are mounted in series on the pipeline.

Advantageously, the modules are equipped with third and fourth pressure limiters, and, for two consecutive modules along the pipeline, the fourth pressure limiter of the second module in the direction of flow of the dihydrogen in the pipeline is the third pressure limiter of the first module.

The invention also proposes an aircraft comprising a dihydrogen tank, an engine and a module according to one of the preceding variants, in which the pipeline is fluidically connected between the tank and the engine.

The invention also proposes an aircraft comprising a dihydrogen tank, an engine and a supply system according to one of the preceding variants, in which the pipeline is fluidically connected between the tank and the engine.

BRIEF DESCRIPTION OF THE DRAWINGS

The features of the invention mentioned above, and others, will emerge more clearly on reading the following description of an exemplary embodiment, said description being given in relation to the attached drawings, in which.

DETAILED EXPLANATION OF THE PREFERRED EMBODIMENTS

Figure 1:
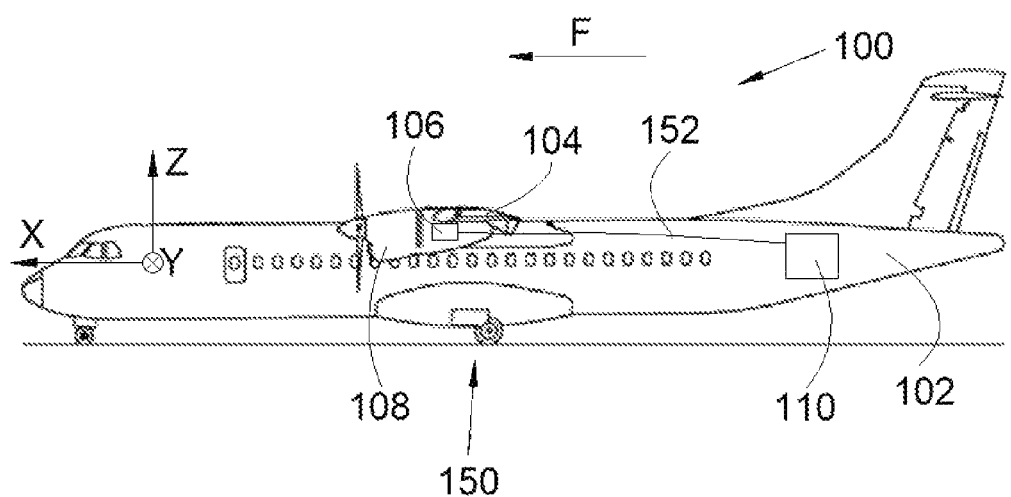
FIG. 1 is a side view of an aircraft according to the invention.

In the following description, the terms relating to a position are taken with reference to an aircraft in normal flight position, that is to say as is represented in FIG. 1.

In the following description, and by convention, X denotes the longitudinal direction of the aircraft, Y denotes the transverse direction which is horizontal when the aircraft is on the ground, and Z denotes the vertical direction which is vertical when the aircraft is on the ground, these three directions X, Y and Z being mutually orthogonal.

FIG. 1 shows an aircraft 100 which comprises a fuselage 102 on each side of which is fixed a wing 104 which bears at least one engine 106 operating with dihydrogen as fuel. In the embodiment of the invention presented in FIG. 1, the engine 106 is a propeller engine, but any other type of engine can be envisaged.

The arrow F indicates the direction of forward movement of the aircraft 100.

The aircraft 100 comprises at least one tank 110 in which the dihydrogen is stored, preferentially in liquid form. In the embodiment of the invention, the tank 110 is disposed at the rear of the fuselage 102, but a different positioning is possible.

The aircraft 100 also comprises a supply system 150 which ensures the fluidic connection between a tank 110 and an engine 106 housed in a nacelle 108.

The supply system 150 comprises, among other things, a general pipeline 152 which is fluidically connected between the tank 110 and the engine 106 to be supplied.

Figure 2:
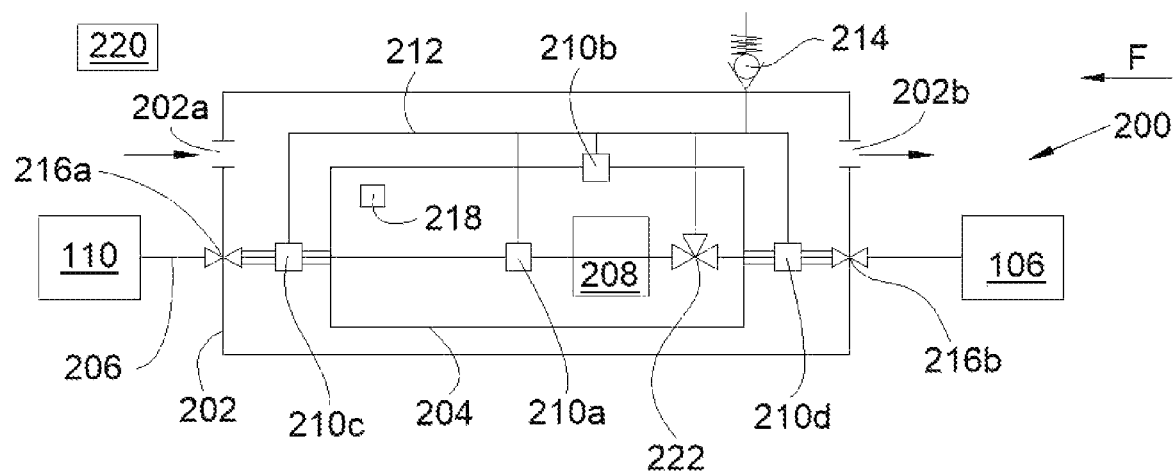
FIG. 2 is a schematic representation of a module according to the invention.

FIG. 2 shows a module 200 which comprises a portion of the general pipeline 152, namely a pipeline referenced 206 which is therefore intended to be fluidically connected between the tank 110 and the engine 106. In particular, this pipeline 206 is of the double-skin type.

The module 200 comprises an outer box 202 having a wall forming an enclosure and having a first opening forming an air inlet 202a and a second opening forming an air outlet 202b. The outer box 202 is for example the nacelle 108 or any other element delimiting a restricted volume. An air current with the air coming from the outside of the aircraft 100 can then be created between the air inlet 202a and the air outlet 202b.

In the embodiment of the invention presented in FIG. 2, the outer box 202 is oriented so as to have the air inlet 202a toward the front of the aircraft 100 and the air outlet 202b toward the rear of the aircraft 100 so as to benefit from the dynamic pressure created during the flight phases by virtue of the movement of the aircraft 100 and thus ensure a good flow of the air in the outer box 202.

The module 200 also comprises an inner box 204 having a wall which is leak-tight and in which the inner box 204 is housed in the outer box 202. The inner box 204 is inert, either by the creation of a vacuum, or by the introduction of an inert gas. Preferably, although not mandatorily, the pressure of the inert gas is greater than the pressure of the outer box 202, that is to say here at atmospheric pressure. That makes it possible to avoid having the air contained in the outer box 202 penetrate into the inner box 204 in the event of a leak of the inner box 204.

The pipeline 206 passes through the outer box 202 and the inner box 204. The pipeline 206 thus passes in succession through the wall of the outer box 202, then the wall of the inner box 204, then once again the wall of the inner box 204 and the wall of the outer box 202.

The module 200 also comprises a device 208 housed in the inner box 204. The device 208 is any device which makes it possible to act on the dihydrogen circulating in the pipeline 206 at the inner box 204. As is explained hereinbelow, the device can be a pump, a reheater, or something else.

The module 200 comprises a first pressure limiter 210a mounted on the pipeline 206 in the inner box 204 and a second pressure limiter 210b mounted on the inner box 204.

Associated with the first and second pressure limiters 210a-b, the module 200 comprises an exhaust pipeline 212 fluidically connected between the first pressure limiter 210a, the second pressure limiter 210b and the outside of the outer box 202, and more particularly the outside of the aircraft 100. Thus, if an overpressure occurs in the pipeline 206 or in the inner box 204, the first and second pressure limiters 210a-b ensure that the overpressure is expelled to the outside of the outer box 202, and more particularly the outside of the aircraft 100. The first and second pressure limiters 210a-b can have equal or different discharge pressures.

In the embodiment of the invention presented in FIG. 2, the first pressure limiter 210a is disposed upstream of the device 208 with respect to the direction of flow of the dihydrogen in the pipeline 206, but it can be disposed downstream of said device 208.

The module 200 also comprises an upstream shut-off valve 216a mounted on the pipeline 206 at the inlet of the pipeline 206 in the outer box 202 and a downstream shut-off valve 216b mounted on the pipeline 206 at the outlet of the pipeline 206 in the outer box 202.

The upstream shut-off valve 216a is thus installed at the point where the pipeline 206 passes through the wall of the outer box 202 to enter into said outer box 202 and the downstream shut-off valve 216b is thus installed at the point where the pipeline 206 passes through the wall of the outer box 202 to exit from said outer box 202. The upstream shut-off valve 216a and the downstream shut-off valve 216b are preferentially valves that are driven electrically, pneumatically, or otherwise.

The module 200 comprises detection means 218 which are provided to detect a leak of dihydrogen between the pipeline 206 and the inner box 204 or a leak between the inner box 204 and the outer box 202.

The module 200 comprises a control unit 220 which is in communication with the detection means 218 which are also provided to deliver information representative of a leak and thus inform the control unit 220 thereof.

The control unit 220 is, moreover, arranged to control the opening and closing of each shut-off valve 216a-b as a function of the information delivered by the detection means 218 and according to the requirements as is explained hereinbelow.

With such an arrangement, even if two incidents occur on the module 200, the securing of said module 200 and the evacuation of the dihydrogen to the outside are ensured as is explained hereinbelow.

The detection means 218 can take different forms and can be composed of one or more pressure sensors disposed in the inner box 204. Thus, if a pressure sensor detects a pressure variation in the inner box 204 which is in a vacuum or at a known pressure of an inert gas, that means there is a leak. The detection means 218 can be complemented by detection sensors suited to the detection of dihydrogen and of dioxygen and the analysis of the data transmitted by these detection sensors makes it possible to know if it is the pipeline 206 which is leaking or the inner box 204.

Operation will now be described.

According to a first mode of operation, if the pipeline 206 leaks to the inside of the inner box 204, the dihydrogen spreads in the inner box 204 which rises in pressure until the discharge pressure (for example 3 bar) of the second pressure limiter 210b is reached and the second pressure limiter 210b is opened on the exhaust pipeline 212 to evacuate the dihydrogen to the outside. Because of the pressure variations in the inner box 204, the detection means 218 then detect the presence of the leak and inform the control unit 220 which commands the opening closing of the two shut-off valves 216a-b. The leak is no longer supplied and the inner box 204 remains filled with dihydrogen at the discharge pressure of the second pressure limiter 210b.

If, following the preceding leak, a second leak occurs at the inner box 204, that is to say that the dihydrogen spreads in the outer box 202 which is ventilated by virtue of the air current between the air inlet 202a and the air outlet 202b. The dihydrogen is thus evacuated to the outside of the outer box 202, and more particularly the outside of the aircraft 100.

According to a second mode of operation, when the inner box 204 is inert by the creation of a vacuum or when the pressure of the inert gas in the inner box 204 is lower than the pressure of the outer box 202, if a leak occurs at the inner box 204, the air present in the outer box 202 spreads in the inner box 204 which rises in pressure. Because of the pressure variations in the inner box 204, the detection means 218 then detect the presence of the leak and inform the control unit 220 which commands the closure of the two shut-off valves 216a-b. The pipeline 206 is locked out and it remains filled with dihydrogen at the discharge pressure of the first pressure limiter 210a. Because of the filling of the inner box 204 by the air, the inner box 204 loses its thermal insulation characteristics for the pipeline 206 present in said inner box 204. The dihydrogen present in the pipeline 206 is then also reheated, and the pressure in the pipeline 206 increases until the discharge pressure (for example 60 bar) of the first pressure limiter 210a is reached and the first pressure limiter 210a is opened on the exhaust pipeline 212 to evacuate the dihydrogen to the outside of the outer box 202, and more particularly the outside of the aircraft 100.

If, following the preceding leak, a second leak occurs in the pipeline 206 which is leaking inside the inner box 204, the dihydrogen of the pipeline 206 spreads in the inner box 204 then in the exhaust pipeline 212 through the first pressure limiter 210a or in the outer box 202 through the leak at the inner box 204. The outer box 202 is ventilated because of the air current between the air inlet 202a and the air outlet 202b and the dihydrogen is thus evacuated to the outside of the outer box 202, and more particularly to the outside of the aircraft 100.

Thus, with such an arrangement, even if two incidents occur, the safety is ensured because the risks linked to the creation of an explosive mixture are limited.

In the embodiment of the invention presented in FIG. 2, the exhaust pipeline 212 emerges on the outside via a check valve 214 to avoid the entry of the outside air into the inner box 204.

In the embodiment of the invention presented in FIG. 2, the part of the pipeline 206 which is between the inner box 204 and each shut-off valve 216a-b takes the form of a double-skin pipeline.

The part of the pipeline 206 which is in the inner box 204 here takes the form of a single-skin pipeline.

In the embodiment of the invention presented in FIG. 2, the module 200 comprises a third pressure limiter 210c and a fourth pressure limiter 210d.

The third pressure limiter 210c is mounted between the exhaust pipeline 212 and the pipeline 206 upstream of the inner box 204 in order to ensure a discharging of the pipeline 206 to the exhaust pipeline 212 then the outside of the outer box 202, and more particularly the outside of the aircraft 100 if the pressure in the pipeline 206 exceeds the discharge pressure of the third pressure limiter 210c.

In the same way, the fourth pressure limiter 210d is mounted between the exhaust pipeline 212 and the pipeline 206 downstream of the inner box 204 in order to ensure a discharging of the pipeline 206 to the exhaust pipeline 212 then the outside of the outer box 202, and more particularly the outside of the aircraft 100 if the pressure in the pipeline 206 exceeds the discharge pressure of the fourth pressure limiter 210d.

According to a particular embodiment of the invention, the module 200 comprises a discharge valve 222 which is controlled by the control unit 220. The discharge valve 222 is mounted on the pipeline 206 which is in the inner box 204 and is fluidically connected to the exhaust pipeline 212. The discharge valve 222 is preferentially a valve driven electrically, pneumatically, or otherwise.

On command from the control unit 220, the discharge valve 222 can alternately take a first position in which the discharge valve 222 lets the dihydrogen flow in the pipeline 206 by preventing the flow of the dihydrogen to the exhaust pipeline 212, and a second position, in which the discharge valve 222 lets the dihydrogen flow in the pipeline 206 and the exhaust pipeline 212 to meet the outside of the outer box 202, and more particularly the outside of the aircraft 100.

Thus, when no leak is detected, the control unit 220 controls the discharge valve 222 for it to take the first position, and when a leak is detected and the shut-off valves 216a-b are closed, the control unit commands the switching of the discharge valve 222 from the first position to the second position for the dihydrogen present in the pipeline 206 to be evacuated to the outside before any occurrence of a second leak.

In the embodiment of the invention presented in FIG. 2, the discharge valve 222 is downstream of the device 208, but it can be upstream of said device 208.

Figure 3:
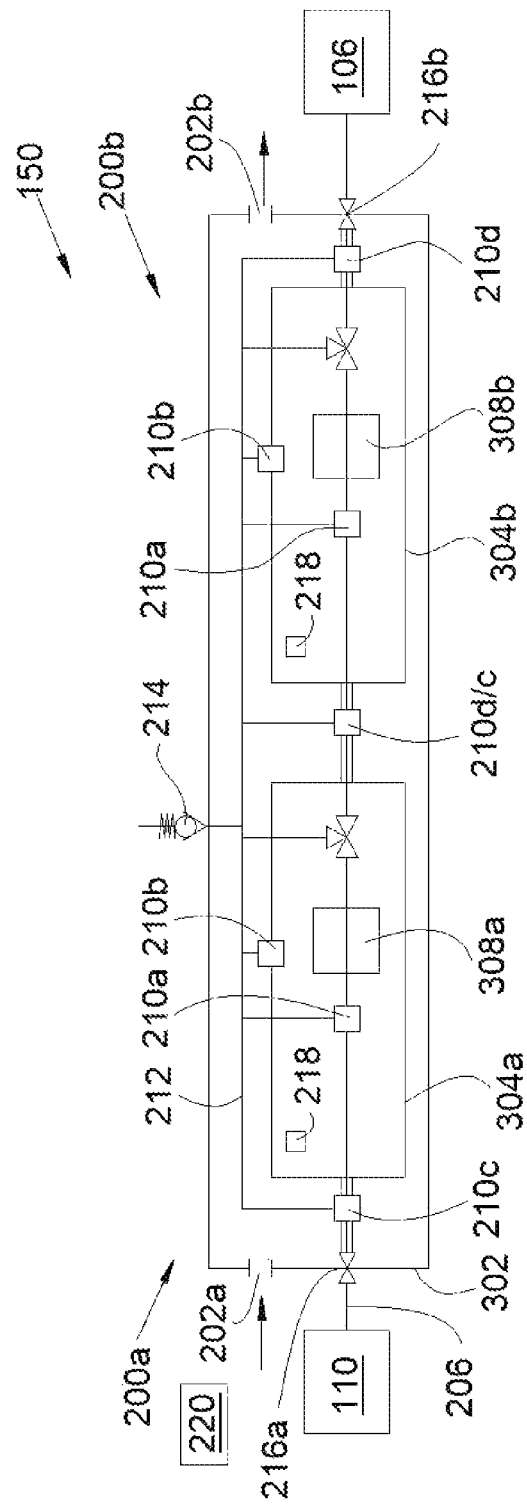
FIG. 3 is a schematic representation of a supply system according to the invention, and FIG. 4 schematically illustrates an example of a control unit implemented in the invention.

FIG. 3 shows an example of a supply system 150 according to the invention in which two modules 200a-b according to the invention have been put in place. Generally, a supply system 150 can comprise at least two modules 200a-b. The pipeline 206 is common to all the modules 200a-b.

The exhaust pipeline 212 is, here, common to all the modules 200a-b and, when it is present, the check valve 214 is common to all the modules 200a-b, but one like the other can be separate.

The outer box 302 is common to all the modules 200a-b.

The control unit 220 is also here common to all the modules 200a-b, but each module 200a-b can have its own control unit 220 which communicates with the other control units 220.

Thus, in a same outer box 302, the inner boxes 304a-b are mounted in series on the pipeline 206.

When the modules 200a-b are equipped with third and fourth pressure limiters 210c-d, for two consecutive modules 200a-b along the pipeline 206, the fourth pressure limiter 210d of the second module 200b in the direction of flow of the dihydrogen in the pipeline 206 is the third pressure limiter 210c of the first module 200a.

In the embodiment of the invention presented in FIG. 3, the part of the pipeline 206 which is between the inner boxes 304a-b takes the form of a double-skin pipeline.

According to a particular embodiment of the invention, the device 308a which is in the box 304a which is just downstream of the tank 110 takes the form of a pump, and the device 308b which is in the box 304b which is just upstream of the engine 106 takes the form of a reheater which ensures the transition of the dihydrogen from the liquid phase to the gaseous phase.

Such a reheater 308b is for example a heat exchanger which ensures an exchange of calories between a hot heat-transfer fluid and the cold dihydrogen, or a system with a heating resistor.

In an advantageous embodiment, the module 200 further comprises a fan provided to enhance the circulation of the air between the air inlet 202a and the air outlet 202b. This fan is controlled by the control unit 220. For example, the control unit 220 controls the operation of the fan during phases of use of the aircraft during which the circulation of the air between the air inlet 202a and the air outlet 202b would be lesser in the absence of operation of the fan, in particular when the aircraft is parked on the ground.

In another advantageous embodiment, the outer box 202 further comprises a so-called overpressure door. This overpressure door is closed in a leak-tight manner in the normal operation of the aircraft 100. It is designed to be opened outward from the outer box 202 when the pressure inside the outer box 202 is greater than a predetermined pressure value. Thus, in the hypothesis in which the circulation of the air between the air inlet 202a and the air outlet 202b would not allow a ventilation inside the outer box 202 that is sufficient to avoid having an explosive mixture inside the outer box 202 following a leak, the overpressure door makes it possible to protect the outer box 202 by being opened if an explosion occurs inside the outer box 202. In a particular embodiment, the inner box 204 also comprises an overpressure door. Thus, in the hypothesis in which the flow rate through the first pressure limiter 210 would not allow a sufficient evacuation of the gas contained in the inner box 204 following a leak, the overpressure door of the inner box 204 makes it possible to protect the inner box 204 by being opened if an explosion occurs inside the inner box 204.

Figure 4:
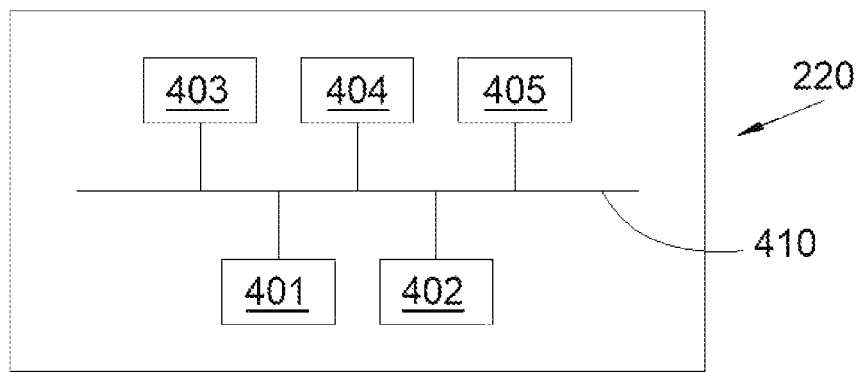

FIG. 4 schematically illustrates an example of a control unit 220 implemented in the invention.

The control unit 220 comprises, linked by a communication bus 410: a processor or CPU ("Central Processing Unit") 401; a RAM ("Random-Access Memory") memory 402; a read-only memory 403, for example of ROM ("Read Only Memory") or EEPROM ("Electrically-Erasable Programmable ROM") type, such as a Flash memory; a storage unit, such as a hard disk HDD ("Hard Disk Drive") 404, or a storage medium reader, such as an SD ("Secure Digital") card reader; and an interface manager I/f 405.

The interface manager I/f 405 allows the control unit 220 to interact with the other components like the detection means 218, the shut-off valves 216a-b, the discharge valve 222, etc.

The processor 401 is capable of executing instructions loaded into the random-access memory 402 from the read-only memory 403, from an external memory, from a storage medium (such as an SD card), or from a communication network. When the control unit 220 is powered up, the processor 401 is capable of reading instructions from the random-access memory 402 and execute them. These instructions form a computer program causing the implementation, by the processor 401, of all or part of the steps, methods and operations described here.

All or part of the steps, methods and operations described here can thus be implemented in software form by execution of a set of instructions by a programmable machine, for example a processor of DSP ("Digital Signal Processor") type or a microcontroller, or be implemented in hardware form by a machine or a dedicated electronic component ("chip") or a dedicated set of electronic components ("chipset"), for example, an FPGA ("Field Programmable Gate Array") or ASIC ("Application Specific Integrated Circuit") component. Generally, the control unit 220 comprises the electronic circuitry suited and configured to implement the operations, methods and steps described here.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A module for a dihydrogen supply system for an aircraft comprising a dihydrogen tank and an engine, said module comprising:
    an outer box having an air inlet and an air outlet,
    a leak-tight inner box, inert and housed in the outer box,
    a pipeline configured to be fluidically connected between the dihydrogen tank and the engine, and passing through the outer box and the inner box,
    a device housed in the inner box and configured to act on the dihydrogen circulating in the pipeline,
    a first pressure limiter mounted on the pipeline in the inner box,
    a second pressure limiter mounted on the inner box,
    an exhaust pipeline fluidically connected between the first pressure limiter, the second pressure limiter, and outside of the module, the exhaust pipeline configured to be fluidically connected to outside of the aircraft when the module is installed in the aircraft,
    an upstream shut-off valve mounted on the pipeline at an inlet of the pipeline in the outer box,
    a downstream shut-off valve mounted on the pipeline at an outlet of the pipeline in the outer box,
    detection means provided to detect a leak between the pipeline and the inner box or a leak between the inner box and the outer box and to deliver information representative of a leak, and
    a control unit configured to control an opening and a closing of each of the upstream shut-off valve and the downstream shut-off valve as a function of the information delivered by the detection means.

2. The module of claim 1, wherein the exhaust pipeline is configured to emerge outside of the aircraft, when the module is installed in the aircraft, via a check valve.

3. The module of claim 1, wherein a part of the pipeline between the inner box and each of the upstream shut-off valve and the downstream shut-off valve comprises a double-skin pipeline.

4. The module of claim 1, further comprising:
a third pressure limiter and a fourth pressure limiter, wherein the third pressure limiter is mounted between the exhaust pipeline and the pipeline upstream of the inner box and the fourth pressure limiter is mounted between the exhaust pipeline and the pipeline downstream of the inner box.

5. The module of claim 1, wherein the outer box is configured to be oriented so as to have the air inlet toward a front of the aircraft and the air outlet toward a rear of the aircraft, when the module is installed in the aircraft.

6. The module of claim 1, further comprising:
a discharge valve mounted on the pipeline within the inner box and fluidically connected to the exhaust pipeline, wherein, on command from the control unit, the discharge valve takes, alternately, a first position in which the discharge valve lets dihydrogen flow in the pipeline by preventing a flow of dihydrogen to the exhaust pipeline, or a second position, in which the discharge valve lets dihydrogen flow in the pipeline and the exhaust pipeline.

7. A dihydrogen supply system for an aircraft comprising:
a dihydrogen tank,
an engine, and
at least two modules of claim 1,
wherein the pipeline is common to each of the at least two modules,
wherein the outer box is common to each of the at least two modules, and
wherein the inner boxes of each of the at least two modules are mounted in series on the pipeline.

8. The supply system of claim 7, wherein the at least two modules are each equipped with a third pressure limiter and a fourth pressure limiter, and
wherein, for two consecutive modules of the at least two modules along the pipeline, the fourth pressure limiter of a second module in a direction of flow of the dihydrogen in the pipeline is the third pressure limiter of a first module in the direction of flow of the dihydrogen in the pipeline.

9. An aircraft comprising:
a dihydrogen tank,
an engine, and
the module of claim 1, wherein the pipeline is fluidically connected between the dihydrogen tank and the engine.

10. An aircraft comprising:
the dihydrogen supply system of claim 7, wherein the pipeline is fluidically connected between the dihydrogen tank and the engine.

* * * * *